United States Patent
Clark et al.

(10) Patent No.: US 11,248,922 B2
(45) Date of Patent: Feb. 15, 2022

(54) PERSONALIZED SOCIAL NAVIGATION COACH

(71) Applicant: International Business Machines Corporation, Armonk, NY (US)

(72) Inventors: Adam T. Clark, Mantorville, MN (US); Aspen L. Payton, Byron, MN (US); Jeffrey K. Huebert, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/178,204

(22) Filed: Nov. 1, 2018

(65) Prior Publication Data

US 2020/0141749 A1    May 7, 2020

(51) Int. Cl.
*G01C 21/34* (2006.01)
*G01C 21/36* (2006.01)
*G06N 20/00* (2019.01)

(52) U.S. Cl.
CPC ..... *G01C 21/3492* (2013.01); *G01C 21/3632* (2013.01); *G01C 21/3667* (2013.01); *G01C 21/3697* (2013.01); *G06N 20/00* (2019.01)

(58) Field of Classification Search
CPC ............ G01C 21/3492; G01C 21/3632; G01C 21/3667; G01C 21/3697; G01C 21/3415; G01C 21/3461; G06N 20/00
See application file for complete search history.

(56) References Cited

U.S. PATENT DOCUMENTS

| | | | |
|---|---|---|---|
| 5,457,439 A * | 10/1995 | Kuhn | B60K 35/00 340/435 |
| 6,369,720 B1 | 4/2002 | Wilhelm | |
| 8,548,734 B2 | 10/2013 | Barbeau et al. | |
| 9,286,793 B2 | 3/2016 | Pan et al. | |
| 9,587,952 B1 * | 3/2017 | Slusar | G01C 21/3492 |

(Continued)

FOREIGN PATENT DOCUMENTS

GB        2485581 A    5/2012

OTHER PUBLICATIONS

Hasan et al., "Development of a Crash Risk Probability Model for Freeways Based on Hazard Prediction Index", accepted Oct. 1, 2014, International Journal for Traffic and Transport Engineering, 2014 (p. 466). Retrieved from the Internet at <URL: http://ijtte.com/uploads/2014-12-19/935be804-0730-2d2clJTTE_Vol%204(4)_9.pdf>, Total 6 pp.

*Primary Examiner* — Rami Khatib (74) *Attorney, Agent, or Firm* — Konrad Raynes Davda & Victor LLP; Janaki K. Davda (57) ABSTRACT

Provided are techniques for a personalized, social navigation coach. While a commuter is commuting on a commute path, periodically, current conditions for the commute path are determined. One or more risk factors of having an accident based on the current conditions and a commute model are identified, where the one or more risk factors are associated with one or more icons, and where the commute model uses sensor data comprising historic data at different points in time. A graphic range is generated with an indicator that indicates an amount of risk of having an accident along the graphic range. The one or more icons and the graphic range are displayed.

20 Claims, 9 Drawing Sheets

(56) References Cited

U.S. PATENT DOCUMENTS

| | | | |
|---|---|---|---|
| 9,643,493 B2 | 5/2017 | Kasai et al. | |
| 10,217,169 B2* | 2/2019 | Schumann, Jr | G06Q 40/08 |
| 2008/0033644 A1* | 2/2008 | Bannon | G01C 21/3461 |
| | | | 701/414 |
| 2009/0187343 A1* | 7/2009 | Koch-Groeber | B60K 35/00 |
| | | | 701/301 |
| 2014/0074356 A1* | 3/2014 | Bone | G08G 1/167 |
| | | | 701/41 |
| 2017/0089710 A1* | 3/2017 | Slusar | B60R 1/00 |
| 2017/0241791 A1* | 8/2017 | Madigan | G06Q 40/08 |
| 2017/0295125 A1 | 10/2017 | Lee et al. | |
| 2017/0368937 A1* | 12/2017 | Bostick | G01S 5/0205 |
| 2018/0170375 A1* | 6/2018 | Jang | B60K 28/06 |
| 2018/0341888 A1* | 11/2018 | Kislovskiy | G06Q 10/0635 |
| 2019/0283745 A1* | 9/2019 | Nagel | G06Q 40/08 |

\* cited by examiner

PERSONALIZED SOCIAL NAVIGATION COACH

BACKGROUND

1. Field of the Invention

Embodiments of the invention relate to a personalized, social navigation coach.

2. Description of the Related Art

Every weekday, a driver may wake up at the same time, leave the house at the same time, and drive the same vehicle (e.g., to work or school). The driver may take the same route to work. However, small variations in the driver's routine, along with the routine of others, may lead to delays, aggravation or potentially life-threatening accidents. Existing navigation systems identify routes for driving between locations based only on traffic conditions (e.g., congestion or accidents).

SUMMARY

In accordance with embodiments, a computer-implemented method is provided for a personalized, social navigation coach. The computer-implemented method performs operations. While a commuter is commuting on a commute path, periodically, current conditions for the commute path are determined. One or more risk factors of having an accident based on the current conditions and a commute model are identified, where the one or more risk factors are associated with one or more icons, and where the commute model uses sensor data comprising historic data at different points in time. A graphic range is generated with an indicator that indicates an amount of risk of having an accident along the graphic range. The one or more icons and the graphic range are displayed.

In accordance with other embodiments, a computer program product is provided for a personalized, social navigation coach. The computer program product comprising a computer readable storage medium having program code embodied therewith, the program code executable by at least one processor to perform operations. While a commuter is commuting on a commute path, periodically, current conditions for the commute path are determined. One or more risk factors of having an accident based on the current conditions and a commute model are identified, where the one or more risk factors are associated with one or more icons, and where the commute model uses sensor data comprising historic data at different points in time. A graphic range is generated with an indicator that indicates an amount of risk of having an accident along the graphic range. The one or more icons and the graphic range are displayed.

In yet other embodiments, a computer system is provided for a personalized, social navigation coach. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. While a commuter is commuting on a commute path, periodically, current conditions for the commute path are determined. One or more risk factors of having an accident based on the current conditions and a commute model are identified, where the one or more risk factors are associated with one or more icons, and where the commute model uses sensor data comprising historic data at different points in time. A graphic range is generated with an indicator that indicates an amount of risk of having an accident along the graphic range. The one or more icons and the graphic range are displayed.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
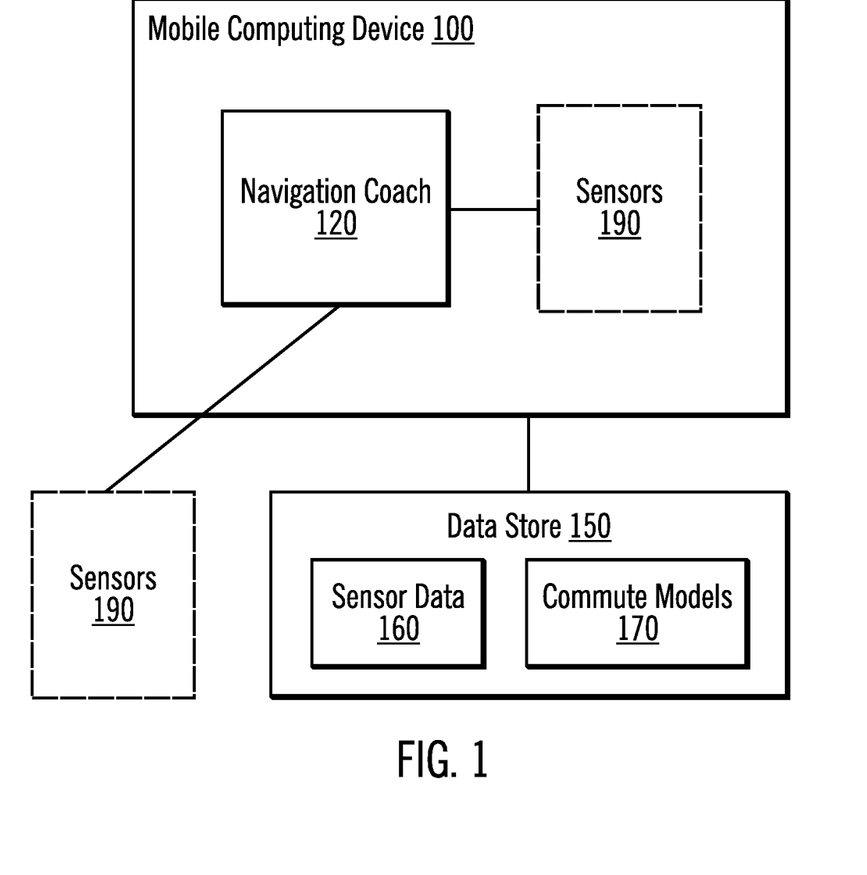
FIG. 1 illustrates, in a block diagram, a computing environment in accordance with certain embodiments.

FIG. 1 illustrates, in a block diagram, a computing environment in accordance with certain embodiments. In FIG. 1, a mobile computing device 100 is coupled to a data store 150. The computing device 100 includes a navigation coach 120. The data store 150 includes sensor data 160 and commute models 170.

In certain embodiments, the mobile computing device 100 is a smart phone, a tablet computer, a laptop computer, etc.

A commuter may be driving a car, walking on foot, riding a bicycle, sailing a boat, etc. A commute path has a starting point and an ending point. Sensors 190 may be part of the mobile computing device 100 or external to (and separate from) the mobile computing device 100. In certain embodiments, the sensors 190 of the mobile computing device include the camera, and the camera may be used to provide photos or video of wildlife along a path. In various embodiments, the sensors 190 may be attached to a commuter, to clothing or gear worn by the commuter (e.g., a wrist band, shoes, etc.), to a bicycle used by the commuter, to a vehicle (e.g., a car or a boat), to traffic lights, to buildings along the commute path, to objects (e.g., traffic signs, traffic lights, trees, etc.) along the commute path, etc. In certain embodiments, the sensor data 160 includes, at a particular time, photos, videos, sounds, commuter metrics (e.g., speed of a walker, biometrics to indicate an anxiety level of the commuter, etc.), commuter vehicle metrics (e.g., speed, temperature, etc. of the commuter's vehicle), surrounding vehicle metrics (e.g., speed and license plate data of other vehicles in the area of the commuter vehicle), weather, road conditions, wildlife data, a timestamp (date and time of day), etc.

The navigation coach 120 monitors the sensors 190 and stores sensor data 160 in the data store 150. In certain embodiments, the functionality of the monitoring may be in a separate component from the navigation coach 120.

The navigation coach 120 monitors a commuter's surroundings during a routine commute to build a commute model 170 using historic data at different points in time so that the commute model 170 identifies risk factors of historic commutes (e.g., warning signs of problems) that the navigation coach 120 uses to predict risk factors in future commutes. The commute model 170 may be described as providing patterns. Based on the commute model 170, the navigation coach 120 is able to provide suggestions of alternative commute paths to avoid the risk factors of the routine commute path.

In certain embodiments, there may be a commute model 170 for each routine commute path for each of multiple commuters. In certain embodiments, two or more commuters may be in a social group and share the sensor data 160 and/or the commute models 170. The social group may be described as a social network or social circle.

Figure 2:
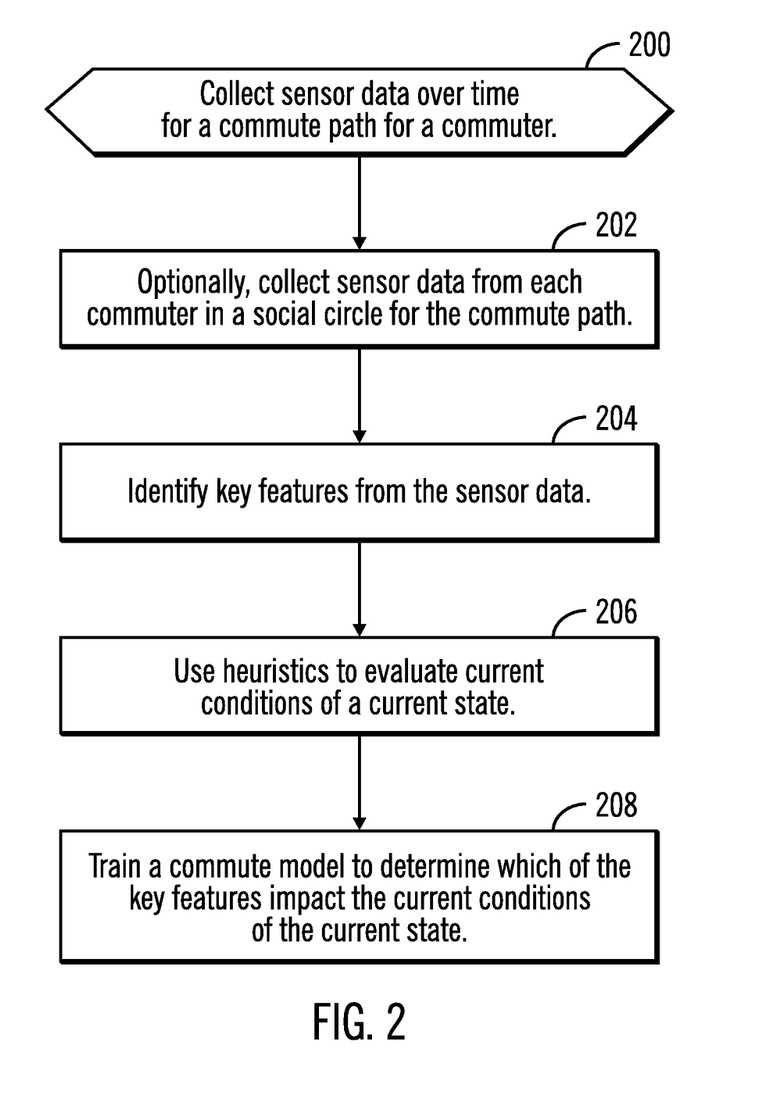
FIG. 2 illustrates, in a flowchart, operations for generating a commute model for a commute path in accordance with certain embodiments.

FIG. 2 illustrates, in a flowchart, operations for generating a commute model for a commute path in accordance with certain embodiments. Control begins at block 200 with the navigation coach 120 collecting sensor data over time for a commute path for a commuter. This sensor data over time is historic data at different points in time that includes, for each particular time, any combination of: photos, videos, sounds, commuter metrics (e.g., speed of a walker, biometrics to indicate an anxiety level of the commuter, etc.), commuter vehicle metrics (e.g., speed, temperature, etc. of the commuter's vehicle), surrounding vehicle metrics (e.g., speed and license plate data of other vehicles in the area of the commuter vehicle), weather, road conditions, wildlife data, a timestamp (date and time of day), etc.

In block 202, the navigation coach 120, optionally, collects sensor data from each commuter in a social group for the commute path. In certain embodiments, a commuter may specify one or more other commuters to be in the social group.

In block 204, the navigation coach 120 identifies key features from the sensor data. That is, the navigation coach 120 processes the sensor data to identify the key features. For example, for a commuter in a car, the key features may include, a number of surrounding cars, an average speed of the surrounding cars, colors of the surrounding cars, license plate numbers of the surrounding cars, rain data, wildlife data, low tire pressure data, a high pulse rate of the commuter, etc.

In block 206, the navigation coach 120 uses heuristics to evaluate current conditions of a current state. Heuristics may be described as a process, usually one that provides a measurement. With embodiments, the heuristics may be used to score/measure the current state based on the sensor data. The current conditions may be described as forming a current state or environment of the commuter. In certain embodiments, the goal is to be at the end point of the commute path based on current conditions ("metrics") such as: distance to end location, speed, comfort (blood pressure of commuter, body temperature of commuter, etc.), accident status along the commute path (which has a negative impact), etc. In certain embodiments, complex conditions (or events) may also be modeled and identified, such as: getting cut off in traffic (high blood pressure and fast pulse combined with distance to nearest preceding vehicle at critical level), losing vehicle control (car sensors for loss of traction or rotational sensor activation), etc. In certain embodiments, the social group may be used to provide the accident status. Avoiding accidents is extremely valuable, and, by sharing data with a social group, the commuter is able to learn from mistakes or bad luck of other commuters in the social group.

In block 208, the navigation coach 120 trains a commute model to determine which of the key features impact the current conditions of the current state. In certain embodiments, the navigation coach 120 trains a commute model to determine which of the key features are most likely to increase commute satisfaction and which of the key features are most likely to decrease commute satisfaction.

Over time, the commute model will evolve. Once trained, the navigation coach 120 uses the commute model to predict whether a particular condition is likely to cause an increase or decrease in commute satisfaction. The increased commute satisfaction is linked to an improved commute path (e.g., there are fewer drivers on a particular path and so decreased anxiety of the commuter), while the decreased commute satisfaction is linked to a worse commute path (e.g., more drivers are rushing and are likely to cause accidents, which increases the anxiety of the commuter).

Figure 3A:
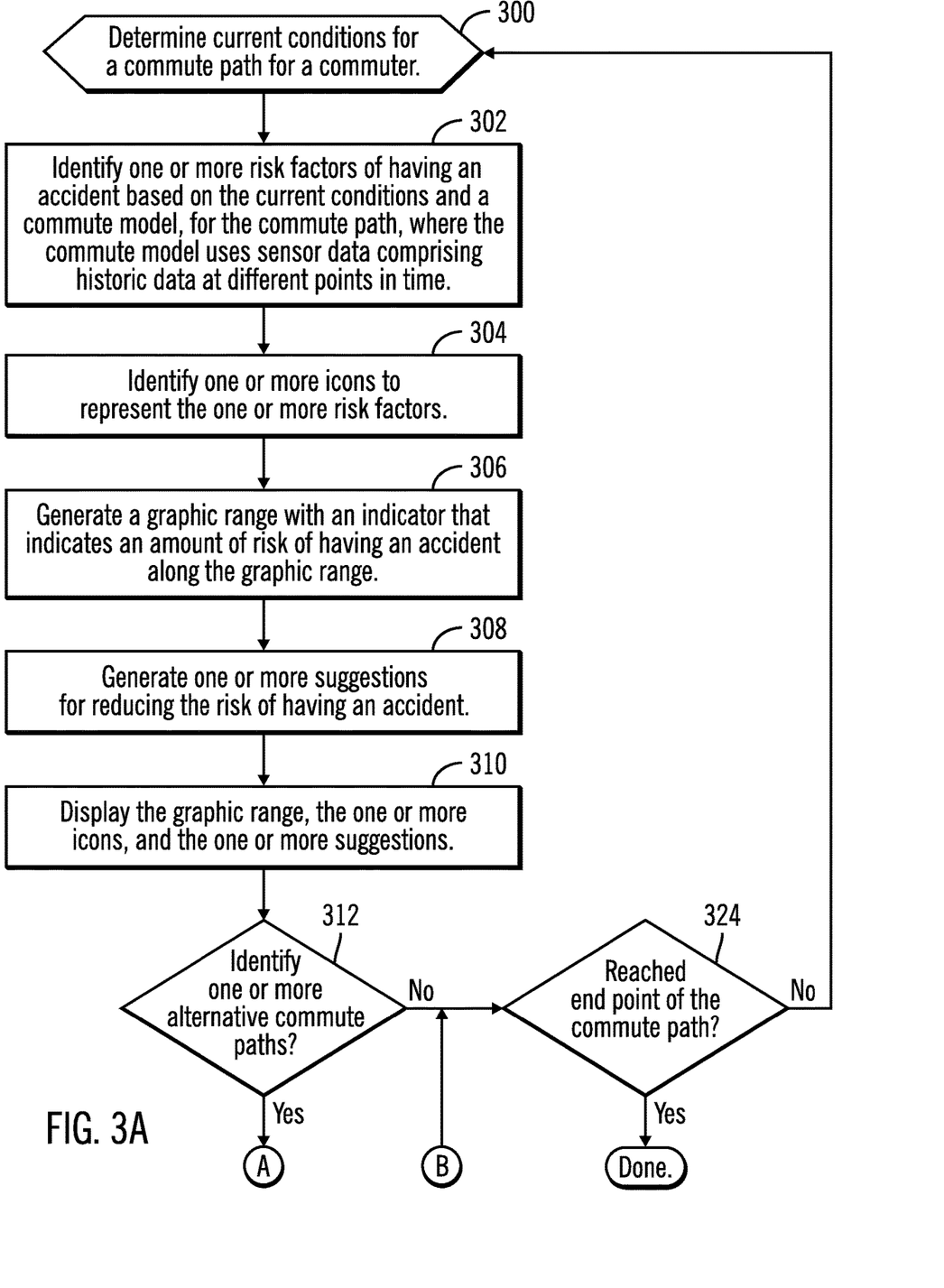
FIGS. 3A and 3B illustrate, in a flowchart, operations for providing navigation guidance in accordance with certain embodiments.
Figure 3B:
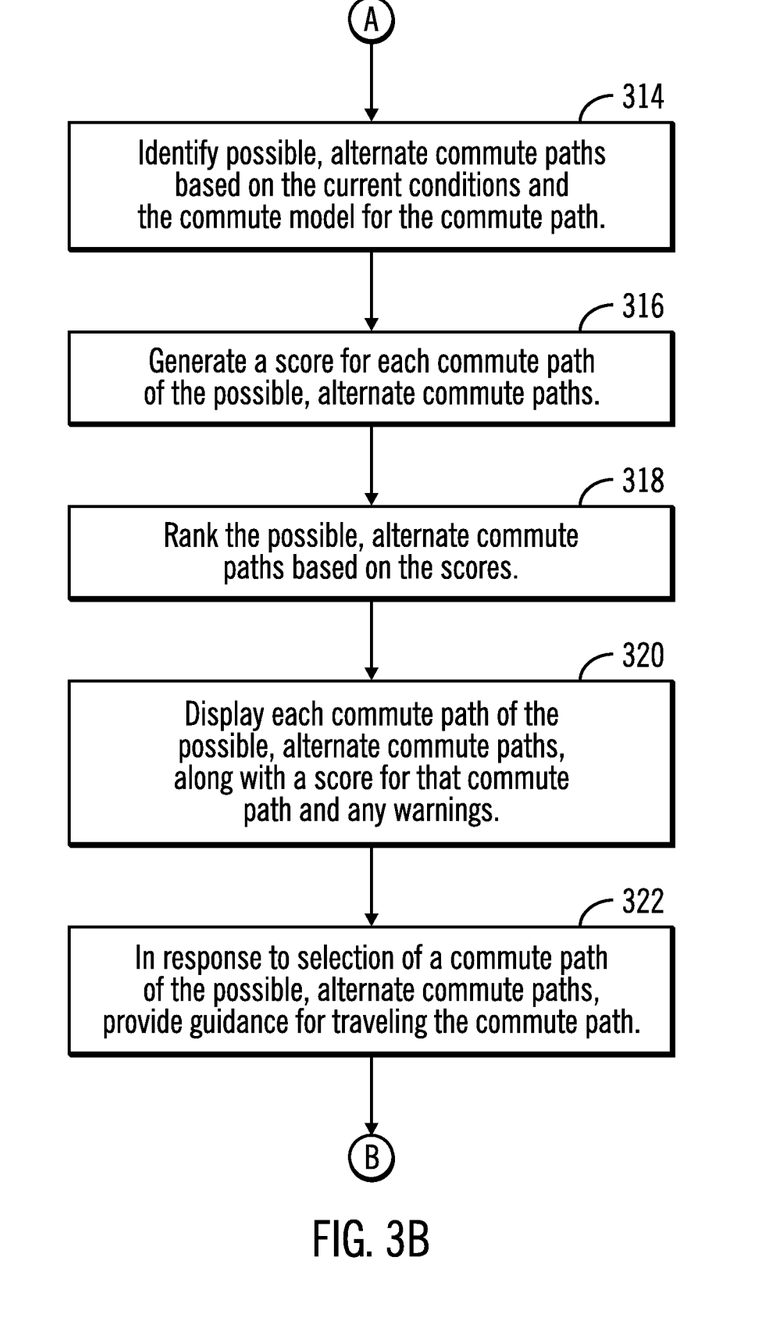

FIGS. 3A and 3B illustrate, in a flowchart, operations for providing navigation guidance in accordance with certain embodiments. In certain embodiments, the processing of FIGS. 3A and 3B occurs periodically, while a commuter is commuting on a commute path. Control begins at block 300 with the navigation coach 120 determining current conditions for a commute path for a commuter.

In block 302, the navigation coach 120 identifies one or more risk factors of having an accident based on the current conditions and a commute model for the commute path, where the commute model uses sensor data comprising historic data at different points in time. In block 304, the navigation coach 120 identifies one or more icons to represent the one or more risk factors. Thus, the one or more risk factors are associated with one or more icons. In block 306, the navigation coach 120 generates a graphic range with an indicator that indicates an amount of risk of having an accident along the graphic range. In block 308, the navigation coach 120 generates one or more suggestions for reducing the risk of having an accident. For example, the suggestions may suggest reducing speed, stopping for a break, etc. In block 310, the navigation coach 120 displays the graphic range and the one or more icons, along with one or more suggestions. In certain embodiments, the navigation coach 120 displays any combination of: the graphic range, the one or more icons, and the one or more suggestions.

In certain embodiments, the navigation coach 120, in response to identifying biometric changes of the user (e.g., indicating increased anxiety or sleepiness), automatically modifies the temperature and sound in the vehicle (e.g., to decrease anxiety or make the commuter more alert).

In block 312, the navigation coach 120 determines whether one or more alternate commute paths are to be determined. If so, processing continues from block 312 (FIG. 3A) to block 314 (FIG. 3B), otherwise, processing continues to block 324. For example, if the likelihood of an accident is less than a predetermined percentage (e.g., less than 50% likely), then one or more alternative commute paths may not be determined. The predetermined percentage may be set by the commuter.

In block 324, the navigation coach 120 determines whether the end point of the commute path has been reached. If so, processing ends, otherwise, processing continues to block 300.

In block 314, the navigation coach 120 identifies possible, alternate commute paths for the commute path based on the current conditions and a commute model for the commute path. In block 316, the navigation coach 120 generates a score for each commute path of the possible, alternate commute paths. In certain embodiments, the score is based on how likely that commute path is to increase commute satisfaction.

In block 318, the navigation coach 120 ranks the possible, alternate commute paths based on the scores. In block 320, the navigation coach 120 displays each commute path of the possible, alternate commute paths, along with the score for that commute path and any warnings.

In block 322, in response to selection of a possible, alternate commute path of the possible, alternate commute paths, the navigation coach 120 provides guidance for traveling the commute path (e.g., this may include displaying a map for the commute path and providing audio instructions to travel the commute path).

In certain embodiments, the navigation coach 120 predicts conditions, such as:

The car with license plate "ABC 123" from Minnesota always cuts off other drivers.

Electric vehicles and large trucks (semi's) tend to drive slower than other vehicles.

When raining, driving in the right lane will produce slower, but more consistent speed with fewer stops/starts and less anxiety Thursday mornings, the car with license plate "XYZ 456" drives fast, tailgates, and cuts everyone off. Avoid them. On other days, they aren't typically on the road at the same time as you.

By being able to predict such conditions for a current commute path, the navigation coach 120 acts as a warning system or advice generator, customized to the commuter's personal location, and provides an alternate commute path to avoid risk factors with the current commute path.

Although broad generalizations about all cars may not be made satisfactorily in a global or regional market, the navigation system 120 monitors sensors to collect sensor data over time about a particular commute path (e.g., a commute path regularly taken to work), and empirical evidence provides consistent and valuable training data for such a commute model.

The navigation system 120 enables rapidly populating a commute model by collecting sensor data of a social group and correlating sensor data of different commuters to building a more accurate commute model. By tracking when and where sensors captured sensor data, the navigation coach 120 may merge sensor data of the social group (e.g., family members, friends, coworkers, carpoolers, etc.) and produce a more accurate commute model quickly. In certain embodiments, the sensor data and the commute models of the social group is not stored in a public repository for privacy and security concerns. Also, social sharing of sensor data and the commute models may be peer-to-peer amongst the trusted social group for which the sensor data and the commute models apply. In certain embodiments, a parent may share many years worth of sensor data for a commute path with a child who is just starting to make the same commute and allows early warnings to be displayed without need for significant new training data.

In certain embodiments, the navigation coach 120 is used for motorized vehicles, as well as, other forms of transportation. The navigation coach 120 uses recognized traffic patterns to warn a commuter riding a bike about vehicles that have repeatedly ignored bicyclists or to warn a walking commuter about vehicles that tend to run red lights (jeopardizing commuter safety while crossing the street). Furthermore, the navigation coach 120 may be used in pedestrian-only environments.

Figure 4:
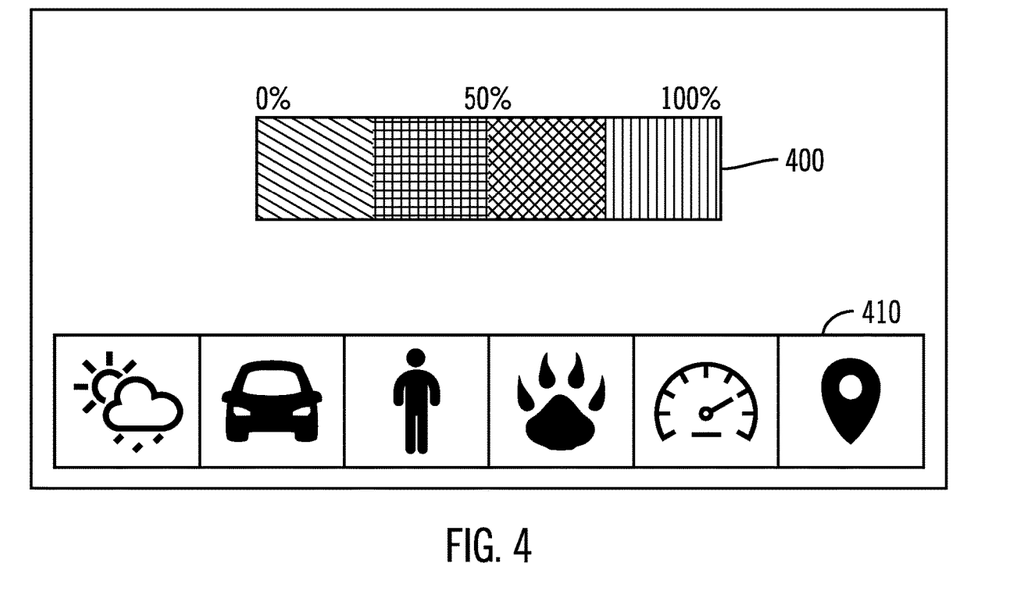
FIG. 4 illustrates example user interface elements in accordance with certain embodiments.

FIG. 4 illustrates example user interface elements in accordance with certain embodiments. To simplify the user interface for the commuter, the navigation coach 120 may display a graphic range 400 of percentage to indicate the likelihood of an accident at any given moment for a commuter path. The graphic range 400 may be described as a scale of least likely to have an accident (starting at zero percent at left most of the graphic range 400) to most likely to have an accident (ending at hundred percent at right most of the graphic range 400).

The navigation coach 120 may also display a set of icons 410 to indicate the reason for a possible accident in a case in which risk has been detected. For example, the set of icons 410 represent potential risk factors of: weather, other vehicles, commuter biometrics, wildlife, speed, and location.

Figure 5:
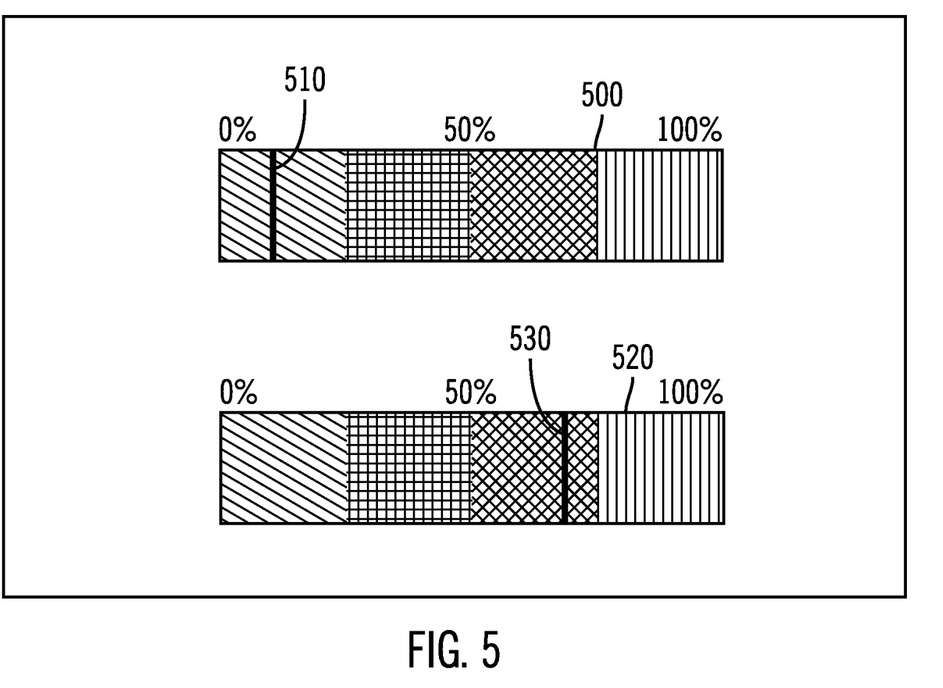
FIG. 5 illustrates a changing graphical range for a first example in accordance with certain embodiments.

FIG. 5 illustrates a changing graphical range for a first example in accordance with certain embodiments. In this first example, a commuter leaves for work before dawn one morning. As the commuter leaves home, the weather is clear and there are few cars on the road. The navigation coach 120 displays graphic range 500 and indicator 510 to show that risk of an accident is very low at this time. As the commuter approaches a wooded area along the commute path, where deer and other wildlife are often present during this time of day, the risk of accident increases. Now, the navigation coach 120 displays a graphic range 420 and indicator 530 to show that the risk of an accident is increased. Optionally, the navigation coach 120 may display the icon for risk factor "wildlife" or may provide an audio warning about the risk factor "wildlife". This allows the commuter to pay more attention to the surroundings. Because the risk of an accident has increased, the navigation coach 120 also displays one or more alternate commute paths that avoid the "wildlife" risk factor, if they are available. Also, the navigation coach 120 calculates the risk of any alternate commute path and displays the alternate commute path along with a score representing the risk. In certain embodiments, the navigation coach 120 displays an alternate commute path if that commute path has a lower risk of accident.

For the first example of FIG. 5, sensor data on the presence of wildlife in this area may have been previously detected by the sensors on the commuter's car or crowd sourced from other vehicles in the region.

Figure 6:
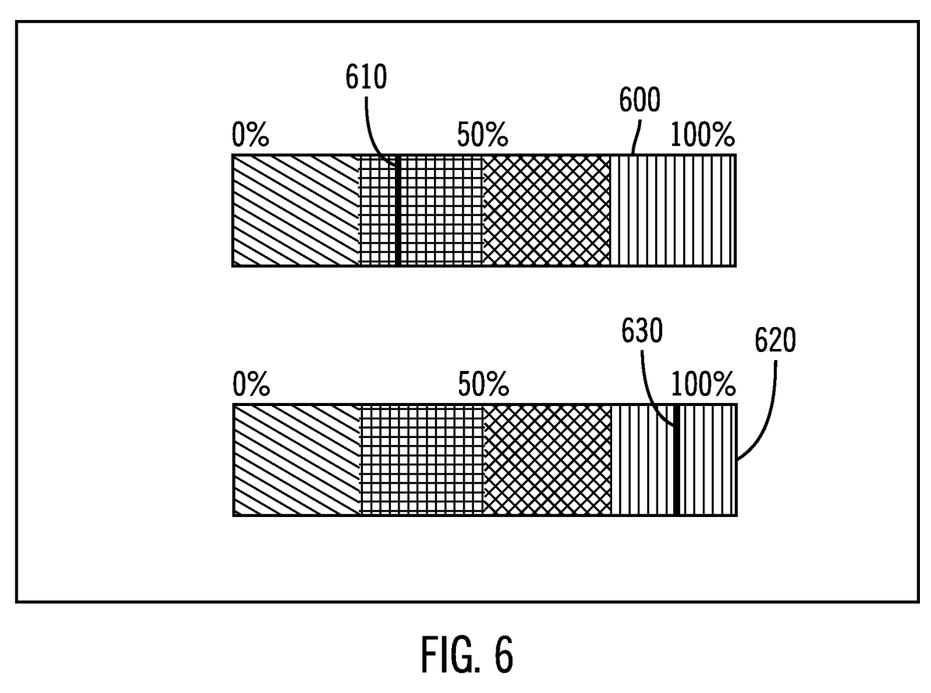
FIG. 6 illustrates a changing graphical range for a second example in accordance with certain embodiments.

FIG. 6 illustrates a changing graphical range for a second example in accordance with certain embodiments. In this second example, a commuter is heading out to the store on the weekend. It has been raining heavily, and there are a lot of cars on the road in the area of the commute path. As the commuter sets out, there is some inherent risk due to the current conditions. The navigation coach 120 displays graphic range 600 and indicator 610 to show that risk of an accident is moderate. As the commuter travels on the highway of the commute path, sensors identify a vehicle with license plate XYZ465. Historical data has detected this vehicle drives erratically at high rates of speed. The risk of an accident with this car present goes up. Now, the navigation coach 120 brings this risky car to the commuter's attention so that the commuter may drive more defensively or may choose to make a stop (e.g., for coffee) so that the commuter is no longer in the proximity of the risky vehicle. In particular, the navigation coach 120 displays graphic range 620 and indicator 630 to show that risk of an accident is increased. Because the risk of an accident has increased, the navigation coach 120 also displays one or more alternate commute paths, if they are available. Also, the navigation coach 120 calculates the risk of any alternate commute path and displays the alternate commute path along with a score representing the risk. In certain embodiments, the navigation coach 120 displays an alternate commute path if that commute path has a lower risk of accident.

In certain embodiments, if the commuter noticed that the starting risk seemed a bit high, the commuter may query the navigation coach 120 prior to leaving to determine whether there are actions that may lower the risk of an accident at the outset of the commute. The navigation system 120 calculates the initial risk based on the commuter's typical driving habits. The navigation system 120 may also inform the commuter that driving slower on this day may lower the initial risk (e.g., from 32% to just 20%).

Figure 7:
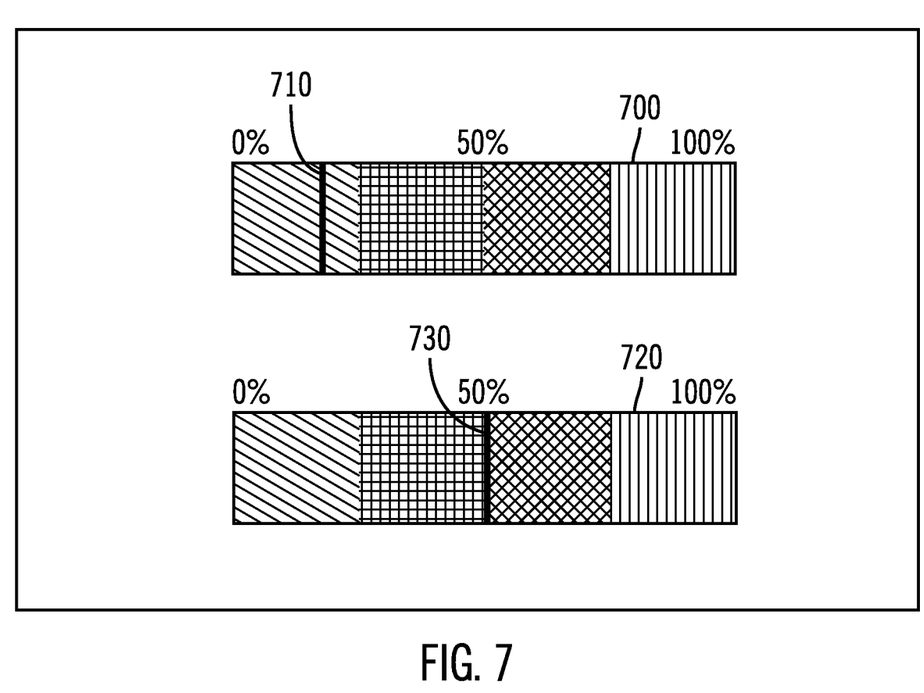
FIG. 7 illustrates a changing graphical range for a third example in accordance with certain embodiments.

FIG. 7 illustrates a changing graphical range for a third example in accordance with certain embodiments. In this third example, the commuter is in the midst of a commute to work. Weather is clear (no rain or snow) and traffic is typical, so the risk of an accident is relatively low. The navigation coach 120 displays graphic range 700 and indicator 710 to show that risk of an accident is low. As the commuter is driving, a car suddenly cuts the commuter off. The commuter takes action to avoid an accident, but biometric data for the commuter indicates that the commuter has been upset by the incident. This leads to an increased risk of accident (which is not extreme, but is notable). The system detects that the change in biometric data is responsible for the increase in risk, and can make environmental changes to help soothe Robert (calming music, temperature change, etc.) Now, the navigation coach 120 displays a graphic range 720 and indicator 730 to show that the risk of an accident is increased. Because the risk of an accident has increased, the navigation coach 120 also displays one or more alternate commute paths, if they are available. Also, the navigation coach 120 calculates the risk of any alternate commute path and displays the alternate commute path along with a score representing the risk. In certain embodiments, the navigation coach 120 displays an alternate commute path if that commute path has a lower risk of accident.

In certain embodiments, the navigation coach 120 ties into another application. This would provide the commuter with a more pro-active way to interface with the navigation coach. For example, the commuter may check the application for a recommendation on the best time to leave for work tomorrow, which would provide with the safest commute path. Also, the commuter may query for an optimal date and commute path for a road trip.

In certain embodiments, the navigation coach 120 trains a commute model for a period of time by: collecting data on a commuter, collecting data on a vehicle used by the commuter on a commute path having a starting point and an ending point and on other vehicles on the commute path, collecting data on weather for the commute path, and collecting data on wildlife and non-vehicle traffic on the commute path. Then, during the commute, the navigation coach 120 provides, periodically (e.g., at different points along the commute path), an indication of a likelihood of an accident based on the commute model and current conditions.

Embodiments provide a warning system that may be used to notify the driver of opportunities to change a routine in a way that leads to avoiding delays, aggravation or potentially life-threatening accidents.

Figure 8:
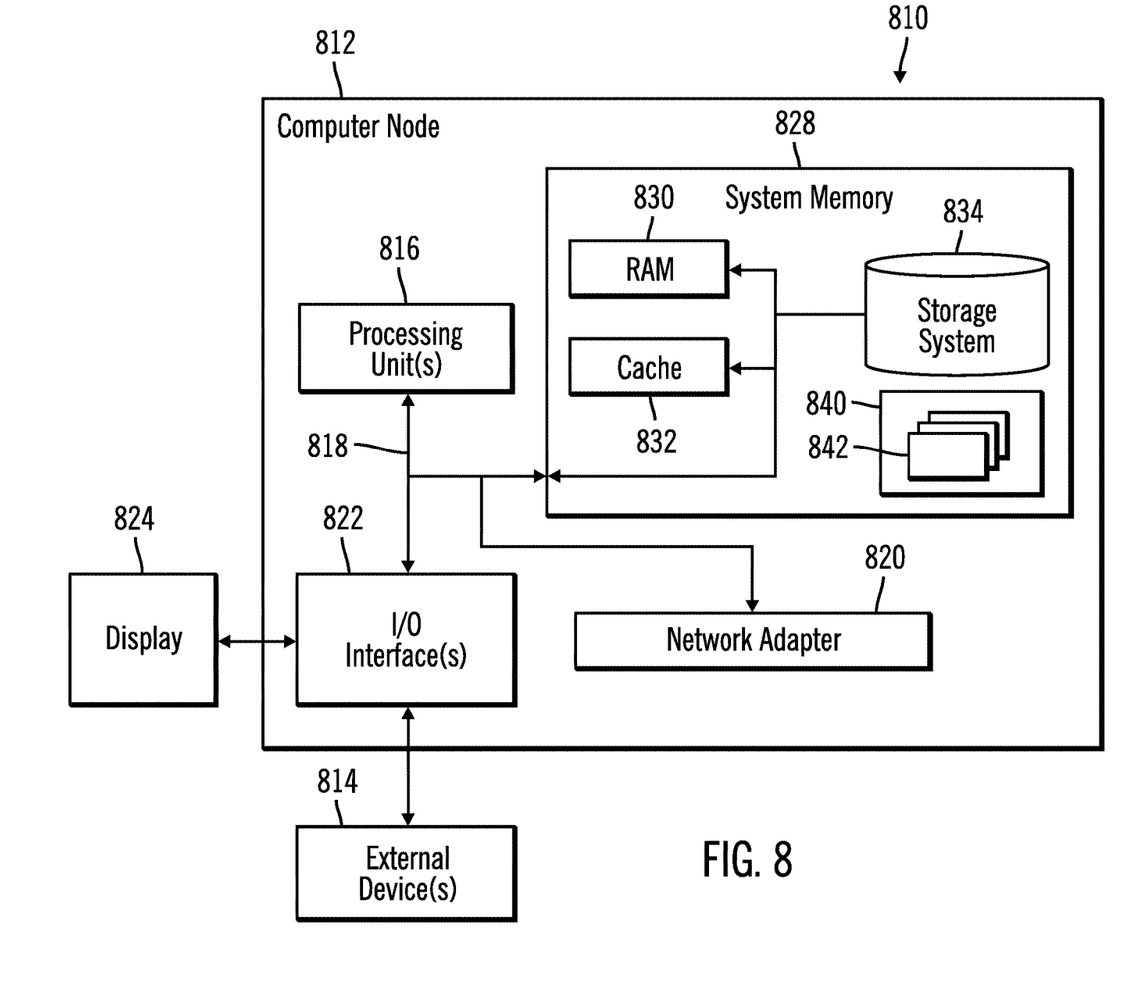
FIG. 8 illustrates a computing node in accordance with certain embodiments.

FIG. 8 illustrates a computing environment 810 in accordance with certain embodiments. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/ non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user (commuter) to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the mobile computing device 100 has the architecture of computer node 812.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method of a mobile computing device, comprising:
   collecting sensor data from sensors for a commute path at different points in time;
   identifying key features from the sensor data;
   training a commute model using the key features; and
   from a starting point to an ending point of the commute path, periodically:
      determining current conditions for the commute path;
      identifying one or more risk factors of having an accident based on the current conditions and the commute model;
      in response to the one or more risk factors identifying biometric changes, automatically modifying at least one of a temperature and a sound;
      displaying a graphic range with an indicator that indicates an amount of risk of having the accident along the graphic range and with icons associated with the one or more risk factors;
      identifying one or more alternative commute paths based on the current conditions and the commute model to avoid the one or more risk factors;
      generating a score for each of the one or more alternative commute paths, wherein each score is based on key features of that alternative commute path increasing commute satisfaction; and
      in response to selection of an alternative commute path of the one or more alternative commute paths, providing guidance for driving the alternative commute path.

2. The computer-implemented method of claim 1, further comprising:
   using heuristics to evaluate the current conditions of a current state.

3. The computer-implemented method of claim 1, wherein the one or more alternative commute paths are identified in response to determining that the amount of risk of having the accident is high.

4. The computer-implemented method of claim 1, further comprising:
   providing suggestions to decrease the amount of risk of having the accident on the commute path.

5. The computer-implemented method of claim 1, wherein the sensor data includes sensor data from the sensors of the mobile computing device and from sensors along the commute path.

6. The computer-implemented method of claim 1, wherein the graphic range comprises a color range with the indicator in the color range to indicate the amount of risk of having the accident.

7. The computer-implemented method of claim 1, wherein a Software as a Service (SaaS) is configured to perform method operations.

8. A computer program product, the computer program product comprising a computer readable storage medium having program code embodied therewith, the program code executable by at least one processor of a mobile computing device to perform:
   collecting sensor data from sensors for a commute path at different points in time;
   identifying key features from the sensor data;
   training a commute model using the key features; and
   from a starting point to an ending point of the commute path, periodically:
      determining current conditions for the commute path;
      identifying one or more risk factors of having an accident based on the current conditions and the commute model;
      in response to the one or more risk factors identifying biometric changes, automatically modifying at least one of a temperature and a sound;
      displaying a graphic range with an indicator that indicates an amount of risk of having the accident along the graphic range and with icons associated with the one or more risk factors;
      identifying one or more alternative commute paths based on the current conditions and the commute model to avoid the one or more risk factors;
      generating a score for each of the one or more alternative commute paths, wherein each score is based on key features of that alternative commute path increasing commute satisfaction; and
      in response to selection of an alternative commute path of the one or more alternative commute paths, providing guidance for driving the alternative commute path.

9. The computer program product of claim 8, wherein the program code is executable by the at least one processor to perform:
using heuristics to evaluate the current conditions of a current state.

10. The computer program product of claim 8, wherein the one or more alternative commute paths are identified in response to determining that the amount of risk of having the accident is high.

11. The computer program product of claim 8, wherein the program code is executable by the at least one processor to perform:
providing suggestions to decrease the amount of risk of having the accident on the commute path.

12. The computer program product of claim 8, wherein the sensor data includes sensor data from the sensors of the mobile computing device and from sensors along the commute path.

13. The computer program product of claim 8, wherein the graphic range comprises a color range with the indicator in the color range to indicate the amount of risk of having the accident.

14. The computer program product of claim 8, wherein a Software as a Service (SaaS) is configured to perform computer program product operations.

15. A computer system of a mobile computing device, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
collecting sensor data from sensors for a commute path at different points in time;
identifying key features from the sensor data;
training a commute model using the key features; and
from a starting point to an ending point of the commute path, periodically:
determining current conditions for the commute path;
identifying one or more risk factors of having an accident based on the current conditions and the commute model;
in response to the one or more risk factors identifying biometric changes, automatically modifying at least one of a temperature and a sound;
displaying a graphic range with an indicator that indicates an amount of risk of having the accident along the graphic range and with icons associated with the one or more risk factors;
identifying one or more alternative commute paths based on the current conditions and the commute model to avoid the one or more risk factors;
generating a score for each of the one or more alternative commute paths, wherein each score is based on key features of that alternative commute path increasing commute satisfaction; and
in response to selection of an alternative commute path of the one or more alternative commute paths, providing guidance for driving the alternative commute path.

16. The computer system of claim 15, wherein the operations further comprise:
using heuristics to evaluate the current conditions of a current state.

17. The computer system of claim 15, wherein the one or more alternative commute paths are identified in response to determining that the amount of risk of having the accident is high.

18. The computer system of claim 15, wherein the operations further comprise:
providing suggestions to decrease the amount of risk of having the accident on the commute path.

19. The computer system of claim 15, wherein the sensor data includes sensor data from the sensors of the mobile computing device and from sensors along the commute path.

20. The computer system of claim 15, wherein a Software as a Service (SaaS) is configured to perform computer system operations.

* * * * *